(12) United States Patent
Tsai

(10) Patent No.: US 10,637,376 B1
(45) Date of Patent: Apr. 28, 2020

(54) DEVICE AND METHOD FOR AUTOMATICALLY DETECTING INITIAL POSITION OF ROTOR OF MOTOR

(71) Applicant: ANPEC ELECTRONICS CORPORATION, Hsinchu (TW)

(72) Inventor: Ming-Jung Tsai, Changhua County (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 16/246,350

(22) Filed: Jan. 11, 2019

(30) Foreign Application Priority Data

Oct. 3, 2018 (TW) .............................. 107134947 A

(51) Int. Cl.
*H02P 6/16* (2016.01)
*H02P 6/28* (2016.01)

(52) U.S. Cl.
CPC .................. *H02P 6/16* (2013.01); *H02P 6/28* (2016.02); *H02P 2203/03* (2013.01); *H02P 2209/13* (2013.01)

(58) Field of Classification Search
CPC ........................................................ H02P 6/16
USPC ................................................... 318/490, 34
See application file for complete search history.

(56) References Cited

U.S. PATENT DOCUMENTS 7,847,498 B2 * 12/2010 Shibuya .................. H02P 6/185
318/400.01

* cited by examiner

*Primary Examiner* — David Luo
(74) *Attorney, Agent, or Firm* — Li & Cai Intellectual Property (USA) Office

(57) ABSTRACT

A device and a method for automatically detecting an initial position of a rotor of a motor are provided. The device includes an initial position detector, a lookup table module and a controller. The initial position detector detects input voltages of the motor. The controller compares the input voltages with each other to determine the initial position of the rotor of the motor. The controller obtains a waveform pattern from the lookup table module to construct an activating waveform signal to be outputted to one of steps of the motor that corresponds to the initial position of the rotor to control the motor to run.

18 Claims, 13 Drawing Sheets

DEVICE AND METHOD FOR AUTOMATICALLY DETECTING INITIAL POSITION OF ROTOR OF MOTOR

CROSS-REFERENCE TO RELATED PATENT APPLICATION

This application claims the benefit of priority to Taiwan Patent Application No. 107134947, filed on Oct. 3, 2018. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates a motor, and in particular to a device and a method for automatically detecting an initial position of a rotor of a motor.

BACKGROUND OF THE DISCLOSURE

As shown in FIG. 12, since a conventional motor driving device cannot obtain an initial position of a rotor of a motor, the conventional motor driving device has to output a pulse signal randomly to any one of three phases of the motor to move the rotor of the motor from an unknown position to a specified positioning position before driving the motor to run. In a positioning mode as shown in FIG. 12, it can be observed that the positioning of the rotor takes a long time before the motor runs. Also, an excessive startup preparation time does not meet customer demands. Furthermore, in the process of moving the rotor of the motor from the unknown position to the positioning position, the motor would vibrate and the fan would shake, resulting in an excessively high decibel noise. After the motor is positioned, the conventional motor driving device usually drives the motor to run by using a square waveform signal having potentials being significantly changed, and thus generates a louder noise than using a sine waveform.

SUMMARY OF THE DISCLOSURE

In response to the above-referenced technical inadequacies, the present disclosure provides a device and a method for automatically detecting an initial position of a rotor of a motor and driving the motor with a sine waveform.

The device for automatically detecting the initial position of the rotor of the motor includes an initial position detector, a lookup table module and a controller. The initial position detector is connected to a voltage input terminal of each of the phases of the motor. The initial position detector is configured to detect an input voltage at the voltage input terminal before the motor runs. The lookup table module is configured to store a plurality of lookup table index values, and a plurality of waveform patterns that correspond to the lookup table index values respectively. The controller is connected to the initial position detector, the lookup table module and the motor. The controller is configured to compare the input voltages with each other from the initial position detector to determine the initial position of the rotor of the motor and a plurality of waveform parameter values. The controller is configured to compare the waveform parameter values with the lookup table index values to obtain one of the waveform patterns that corresponds to the waveform parameter values to construct an activating waveform signal to be outputted to the step of the motor that corresponds to the initial position of the rotor to control the motor to run.

In addition, the method for automatically detecting the initial position of the rotor of the motor includes the following steps: storing a plurality of lookup table index values and a plurality of waveform patterns that respectively correspond to the lookup table index values in a lookup table module; detecting an input voltage at a voltage input terminal of each of the phases of the motor by an initial position detector before the motor runs; comparing the voltage input voltages with each other to determine the initial position of the rotor of the motor and a plurality of waveform parameter values by a controller; comparing the waveform parameter values with the lookup table index values to obtain one of the waveform patterns that corresponds to the waveform parameter values to construct an activating waveform signal by the controller; and supplying the activating waveform signal to the step of the motor that corresponds to the initial position of the rotor from the controller.

As described above, the device and the method for automatically detecting the initial position of the rotor of the motor, which supply different detecting currents to the motor, then detect change in the input voltage of each of the phases of the motor (that is, each of output voltages of the switch module), obtain the time length during which each of the input voltage changes, and determine which one of the steps to which the detecting current is supplied through the coil windings of the motor has a smallest inductance value to determine the initial position of the rotor of the motor. Therefore, the present disclosure can accurately detect the initial position of the motor in a short time and thus can quickly drive the motor to run, without causing the motor to vibrate and generating noise.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
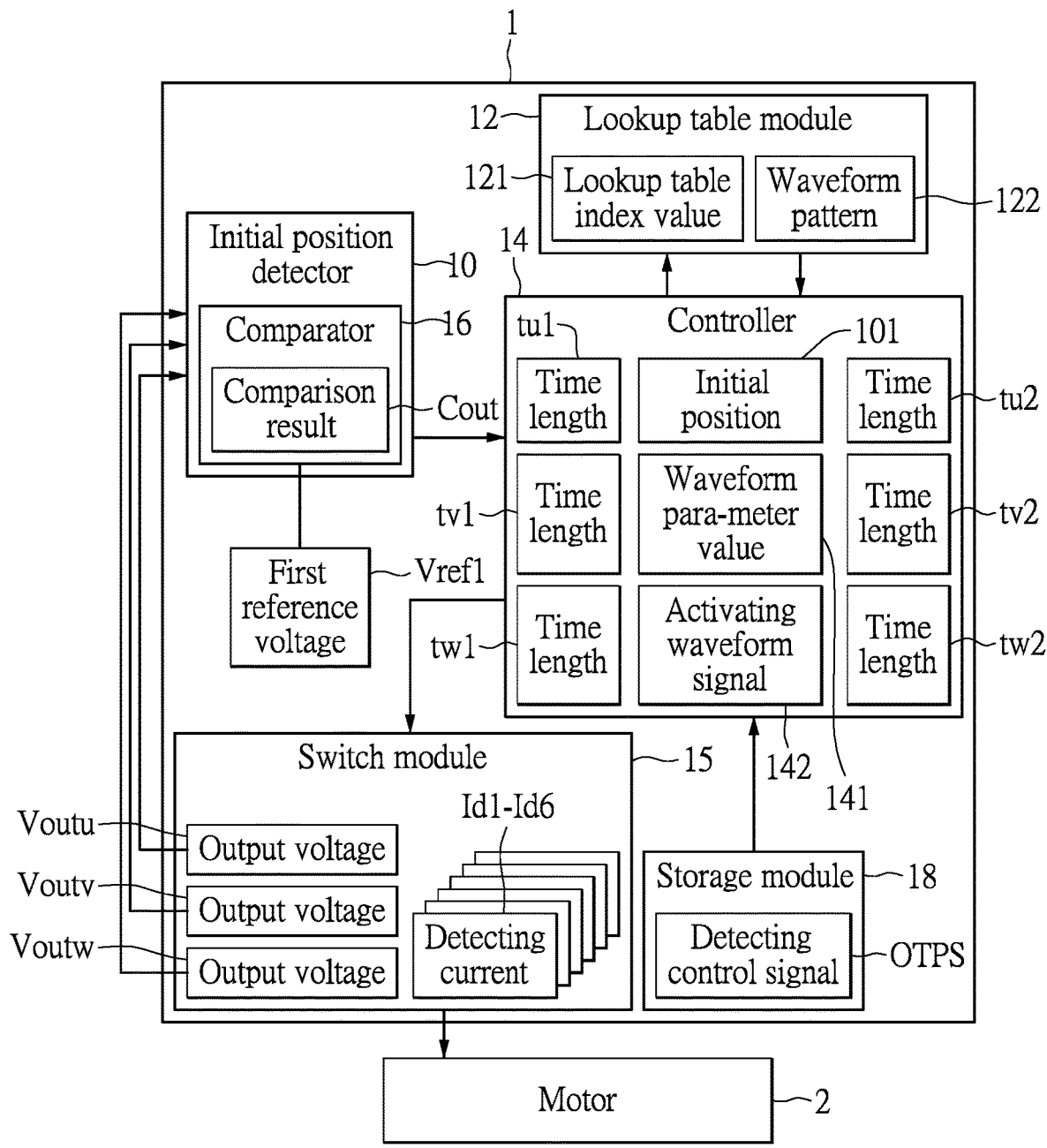
FIG. 1 is a block diagram of a device for automatically detecting an initial position of a rotor of a motor according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2A:
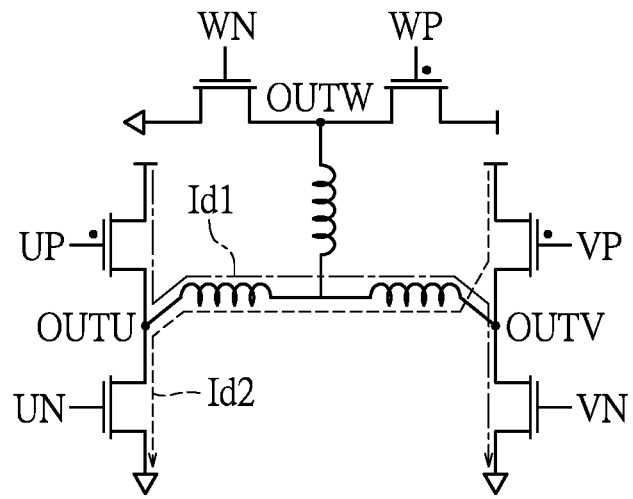
FIGS. 2a to 2c are schematic diagrams of the device for automatically detecting the initial position of the rotor of the motor applied in a three-phase motor having U, V and W phases supplied with detecting currents according to the first embodiment of the present disclosure.
Figure 2B:
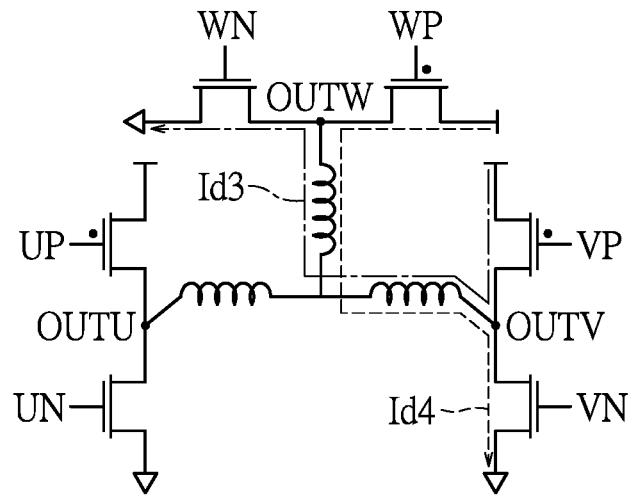
Figure 2C:
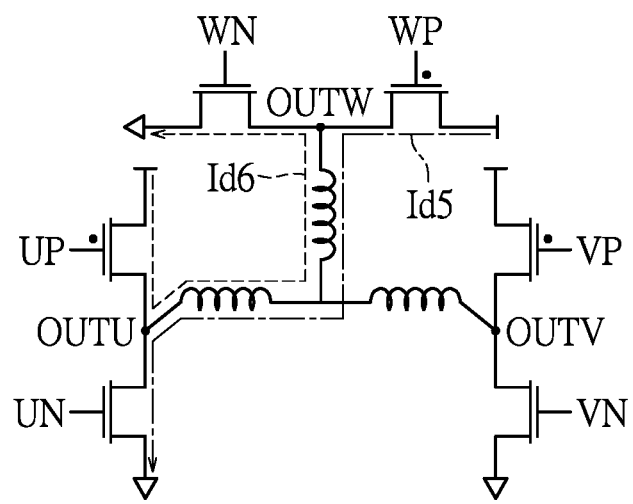
Figure 3:
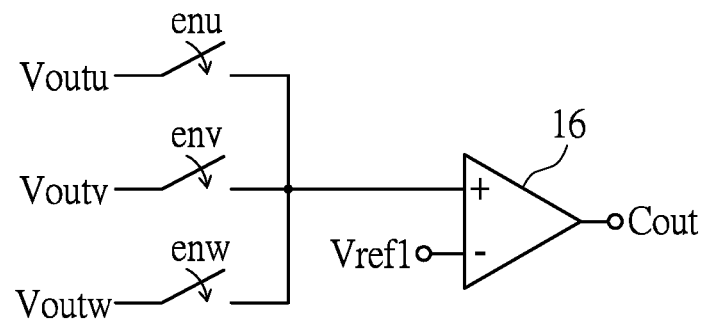
FIG. 3 is a circuit layout of a comparator of the device for automatically detecting the initial position of the rotor of the motor according to the first embodiment of the present disclosure.
Figure 4:
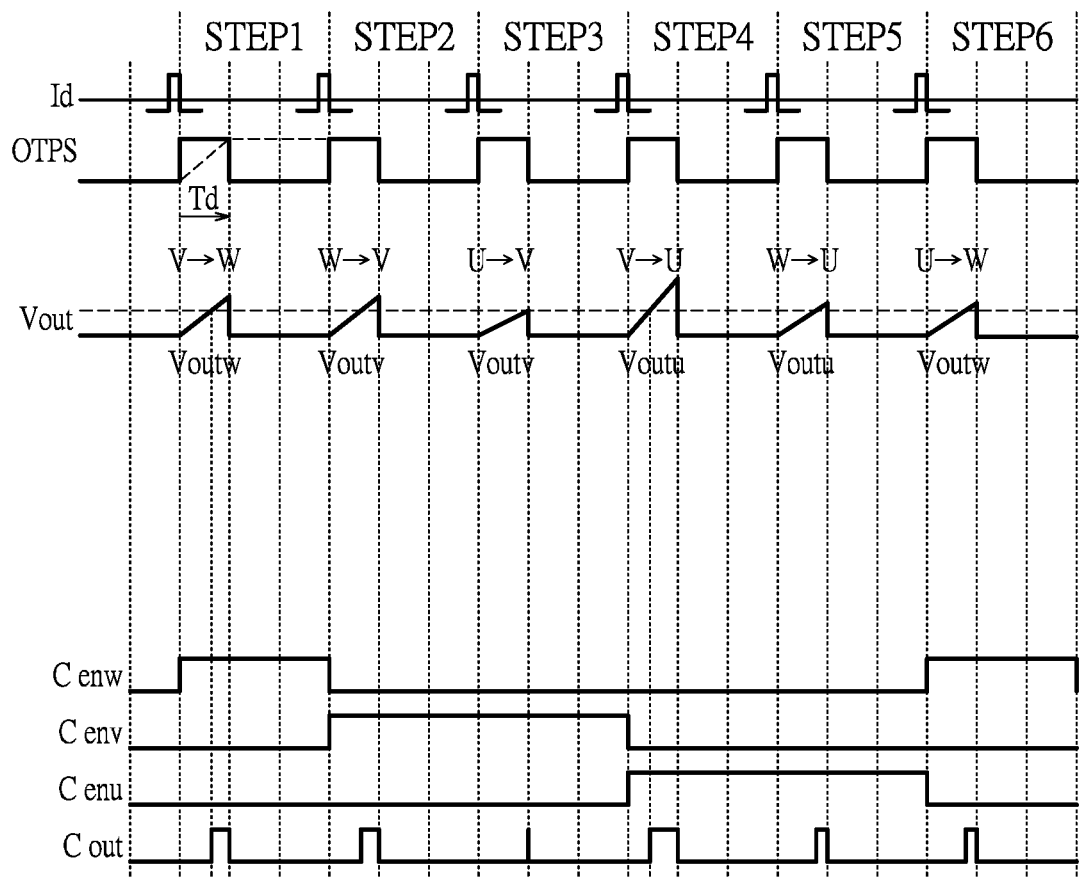
FIG. 4 is a waveform diagram of signals of a controller, the comparator and the applied motor of the device for automatically detecting the initial position of the rotor of the motor according to the first embodiment of the present disclosure.

Reference is made to FIGS. 1 to 4. FIG. 1 is a block diagram of a device for automatically detecting an initial position of a rotor of a motor according to a first embodiment of the present disclosure; FIGS. 2a to 2c are schematic diagrams of the device for automatically detecting the initial position of the rotor of the motor applied in a three-phase motor having U, V and W phases supplied with detecting currents according to the first embodiment of the present disclosure; FIG. 3 is a circuit layout of a comparator of the device for automatically detecting the initial position of the rotor of the motor according to the first embodiment of the present disclosure; FIG. 4 is a waveform diagram of signals of a controller, the comparator and the applied motor of the device for automatically detecting the initial position of the rotor of the motor according to the first embodiment of the present disclosure.

As shown in FIG. 1, a device 1 for automatically detecting an initial position of a rotor of a motor includes an initial position detector 10, a lookup table module 12, a controller 14, a switch module 15 and a storage module 18. The controller 14 is connected to the initial position detector 10, the lookup table module 12, the controller 14, the switch module 15 and the storage module 18. The initial position detector 10 and the switch module 15 are connected to a motor 2.

The device 1 of the embodiment is applied to the motor 2, which has N phases and M steps, wherein M is equal to twice N. As shown in FIGS. 2a to 2c, in the embodiment, the motor 2 is a three-phase motor, which includes a V phase, a U phase and a W phase, and six steps. The switch module 15 includes an upper bridge UP and a lower bridge UN, which are connected to the U phase of the motor 2. The switch module 15 further includes an upper bridge VP and a lower bridge VN, which are connected to the V phase of the motor 2. The switch module 15 further includes an upper bridge WP and a lower bridge WN, which are connected to the W phase of the motor 2.

The switch module 15 may be connected to an input voltage source. The controller 14 may control the switch module 15 to supply detecting currents Id1 to Id6 respectively at different time points to the six steps of the three-phase motor 2 such as six steps STEP1 to STEP6 as shown in FIG. 4 through the switch module 15 from the input voltage source.

As shown in FIG. 2a, the detecting currents Id1 and Id2 are supplied between the V phase and U phase of the motor 2. More specifically, a switch component such as a transistor of the upper bridge UP is turned on to allow the detecting current Id1 to flow through the switch component of the upper bridge UP. The detecting current Id1 then flows to the lower bridge VN of the switch module 15 through two coil windings of the motor 2 between a voltage output terminal OUTU and a voltage output terminal OUTV of the switch module 15. On the other hand, before or after the detecting current Id1 is supplied, the detecting current Id2 is supplied to the lower bridge UN of the switch module 15 through the two coil windings of the motor 2 between the voltage output terminal OUTU and the voltage output terminal OUTV of the switch module 15 through the upper bridge VP of the switch module 15.

As shown in FIG. 2b, the detecting currents Id3 and Id4 are supplied between the V phase and W phase of the motor 2. More specifically, the detecting current Id3 flows to the lower bridge WN of the switch module 15 through two coil windings of the motor 2 between the voltage output terminal OUTV and a voltage output terminal OUTW of the switch module 15 from the upper bridge VP of the switch module 15. On the other hand, before or after the detecting current Id3 is supplied, the detecting current Id4 is supplied to the lower bridge VN of the switch module 15 through the two coil windings of the motor 2 between the voltage output terminal OUTV and the voltage output terminal OUTW of the switch module 15 through the upper bridge WP of the switch module 15.

As shown in FIG. 2c, the detecting currents Id5 and Id6 are supplied between the U phase and W phase of the motor 2. More specifically, the detecting current Id5 flows to the lower bridge UN of the switch module 15 through the two coil windings of the motor 2 between the voltage output terminal OUTW and the voltage output terminal OUTU of the switch module 15 from the upper bridge WP of the switch module 15. On the other hand, before or after the detecting current Id5 is supplied, the detecting current Id6 is supplied to the lower bridge WN of the switch module 15 through the two coil windings of the motor 2 between the voltage output terminal OUTW and the voltage output terminal OUTU of the switch module 15 through the upper bridge UP of the switch module 15.

Alternatively, the initial position detector 10 may include a comparator 16. As shown in FIG. 3, the comparator 16 has a first input terminal, a second input terminal and an output terminal. The first input terminal of the comparator 16 may be connected to the voltage output terminals OUTU, OUTV and OUTW. That is, the first input terminal of the comparator 16 may be connected to voltage input terminals of the three phases of the motor. The comparator 16 obtains output voltages Voutu, Voutv and Voutw of the switch module 15. The second input terminal of the comparator 16 is connected to a first reference voltage Vref1. The comparator 16 may compare each of the output voltages Voutu, Voutv and Voutw of the switch module 15 with first reference voltage Vref1 to obtain a corresponding comparison result Cout. Further, the output terminal of the comparator 16 may be connected to the controller 14. The controller 14 determines a relationship between each of the output voltages Voutu, Voutv and Voutw and the first reference voltage Vref1 according to the comparison result Cout of the comparator 16.

In order to easily control an order in which the output voltages Voutu, Voutv and Voutw of the switch module 15 are inputted to the comparator 16, the voltage output terminals OUTU, OUTV and OUTW of the switch module 15 may be connected to the first input terminal of the comparator 16 through switch components enu, env and enw respectively. The controller 14 may respectively control switching signals Cenu, Cenv and Cenw to switch between a high level and a low level as shown in FIG. 4 to respectively turn on or off the switch components enu, env and enw. For example, when the switch component enu is turned on by the switching signal Cenu, the controller 14 may control the switch module 15 to output the output voltage Voutu to the first input terminal of the comparator 16.

For example, in the embodiment, the first input terminal of the comparator 16 is a non-inverting terminal, which is connected to the voltage output terminals OUTU, OUTV and OUTW of the switch module 15, and the second input terminal of the comparator 16 is an inverting terminal connected to the first reference voltage Vref1.

When the detecting current Id1 is supplied as shown in FIG. 2a and the output voltage Voutv at the voltage output terminal OUTV of the switch module 15 is larger than the first reference voltage Vref1, the comparator 16 outputs the comparison result Cout of logic "1", i.e. a high level. The output voltage Voutv may be equal to the detecting current Id1 multiplied by an equivalent impedance when a transistor of the lower bridge VN is turned on. At this time, the controller 14 may start timing to obtain a time length during which the comparison result Cout is high and record the time length.

Then, when the detecting current Id2 is supplied as shown in FIG. 2a and the output voltage Voutu at the voltage output terminal OUTU of the switch module 15 is larger than the first reference voltage Vref1, the comparator 16 outputs the comparison result Cout representing logic "1". The output voltage Voutu may be equal to the detecting current Id2 multiplied by an equivalent impedance when a transistor of the lower bridge UN is turned on. At this time, the controller 14 may start timing to obtain a time length during which the comparison result Cout is high and record the time length.

Then, when the detecting current Id3 is supplied as shown in FIG. 2b and the output voltage Voutw at the voltage output terminal OUTW of the switch module 15 is larger than the first reference voltage Vref1, the comparator 16 outputs the comparison result Cout representing logic "1". The output voltage Voutw may be equal to the detecting current Id3 multiplied by an equivalent impedance when a transistor of the lower bridge WN is turned on. At this time, the controller 14 may start timing to obtain a time length during which the comparison result Cout is high and record the time length.

Then, when the detecting current Id4 is supplied as shown in FIG. 2b and the output voltage Voutv at the voltage output terminal OUTV of the switch module 15 is larger than the first reference voltage Vref1, the comparator 16 outputs the comparison result Cout representing logic "1". The output voltage Voutv may be equal to the detecting current Id4 multiplied by an equivalent impedance when the transistor of the lower bridge VN is turned on. At this time, the controller 14 may start timing to obtain a time length during which the comparison result Cout is high and record the time length.

Then, when the detecting current Id5 is supplied as shown in FIG. 2c and the output voltage Voutu at the voltage output terminal OUTU of the switch module 15 is larger than the first reference voltage Vref1, the comparator 16 outputs the comparison result Cout representing logic "1". The output voltage Voutu may be equal to the detecting current Id5 multiplied by an equivalent impedance when the transistor of the lower bridge UN is turned on. At this time, the controller 14 may start timing to obtain a time length during which the comparison result Cout is high and record the time length.

Then, when the detecting current Id6 is supplied as shown in FIG. 2c and the output voltage Voutw at the voltage output terminal OUTW of the switch module 15 is larger than the first reference voltage Vref1, the comparator 16 outputs the comparison result Cout representing logic "1". The output voltage Voutw may be equal to the detecting current Id6 multiplied by an equivalent impedance when the transistor of the lower bridge WN is turned on. At this time, the controller 14 may start timing to obtain a time length during which the comparison result Cout is high and record the time length.

Further, a timer is disposed additionally or inside the controller 14. The timer is configured to start timing when each of the output voltages Voutu, Voutv or Voutw is larger than the first reference voltage Vref1. Then, the controller 14 obtains and records time lengths tv1, tu1, tw1, tv2, tw2 and tu2 during which each of the output voltages Voutu, Voutv or Voutw is larger than the first reference voltage Vref1. As shown in FIG. 4, the time lengths tw1, tv1, tv2, tu1, tu2 and tw2 correspond to the steps STEP1 to STEP6 respectively and correspond to six waveforms of a voltage waveform signal Vout respectively.

The controller 14 may compare the time lengths tw1, tv1, tv2, tu1, tu2 and tw2 with each other to determine which one of those is the longest to determine an initial position 101 of the rotor of the motor 2. For example, if the time length tu1 corresponding to the step STEP4 as shown in FIG. 4 is larger than the other time lengths tw1, tv1, tv2, tu2 and tw2, it is determined that a sum inductance value of the two coil windings through which the detecting current Id2 flows to the U phase of the motor 2 from the V phase of the motor 2 as shown in FIG. 2a is the smallest, and thus the initial position 101 of the rotor of the motor 2 can be determined.

The controller 14 may be a microprocessor. The storage module 18 may be built in the controller 14, or disposed additionally as shown in FIG. 1. For example, the storage module 18 may be a one-time programmable (OTP) storage module or other components each having a storing function. The storage module 18 is configured to store signals such as a detecting control signal OTPS shown in FIG. 4 for controlling the operation of the motor 2. The detecting control signal OTPS has a plurality of waveforms, wherein a period of each of which has a shortest constant conduction time Td. Each of the shortest constant conduction times is a shortest time during which the output voltage Voutu, Voutv or Voutw of the switch module 15 of one of the six steps is increased to be larger than the first reference voltage Vref1. The storage module 18 may store the time length in response to the comparison result Cout that is larger than zero. The detecting control signal OTPS having the shortest constant conduction time ensures that a pulse current is not sufficient to turn on a fan and does not generate excessive current impulse noise. The controller 14 may apply the detecting control signal OTPS to control the initial position detector 10 to detect the motor 2 for the shortest constant conduction time, for example, the output voltage waveform signal Vout of the switch module 15 is detected as shown in FIG. 4.

After the initial position 101 of the rotor of the motor 2 is obtained as described above, an activating operation of the motor 2 may be further determined as described in detail below.

Referring to FIG. 1 again, the lookup table module 12 may be a look-up table, a temporary register or a storage cell, which may be built in the controller 14. The lookup table module 12 stores a plurality of lookup table index values 121, and a plurality of waveform patterns 122 that correspond to the lookup table index values 121 respectively. The controller 14 may store a plurality of waveform parameter values 141, such as a duty cycle, a frequency, an amplitude and a sustained acceleration time of each of sine waveform patterns. The controller 14 may determine the waveform parameter values 141 based on the initial position 101 and a target position of the rotor of the motor 2. The controller 14 may then compare the waveform parameter values 141 with the lookup table index values 121 of the lookup table module 12 to obtain one of waveform patterns 122 that corresponds to the waveform parameter values 141 to construct an activating waveform signal 142.

For example, the waveform pattern 122 includes the plurality of sine waveform patterns, and the activating waveform signal 142 is an ideal sine waveform signal. Compared with driven by a square waveform, the motor 2 driven by a sine waveform may cause less electromagnetic noise.

More precisely, N sample points of the sine waveform may be discretized by an analog-to-digital converter (ADC). The controller 14 may adjust parameters of the N sampling points, and then output a digital signal having digits of the discretized N sampling points to a digital-to-analog converter (DAC). The digital-to-analog converter converts the digital signal into an analog signal to generate the activating waveform signal 142.

The switch module 15 may be a full-bridge driving controller. The controller 14 may then supply the activating waveform signal 142 to one of the steps of the motor 2 that corresponds to the initial position 101 of the rotor of the motor 2 through the switch module 15 such that each of the three phases of the motor 2 has a given voltage so as to drive the motor 3 to run from the initial position 101.

Figure 5:
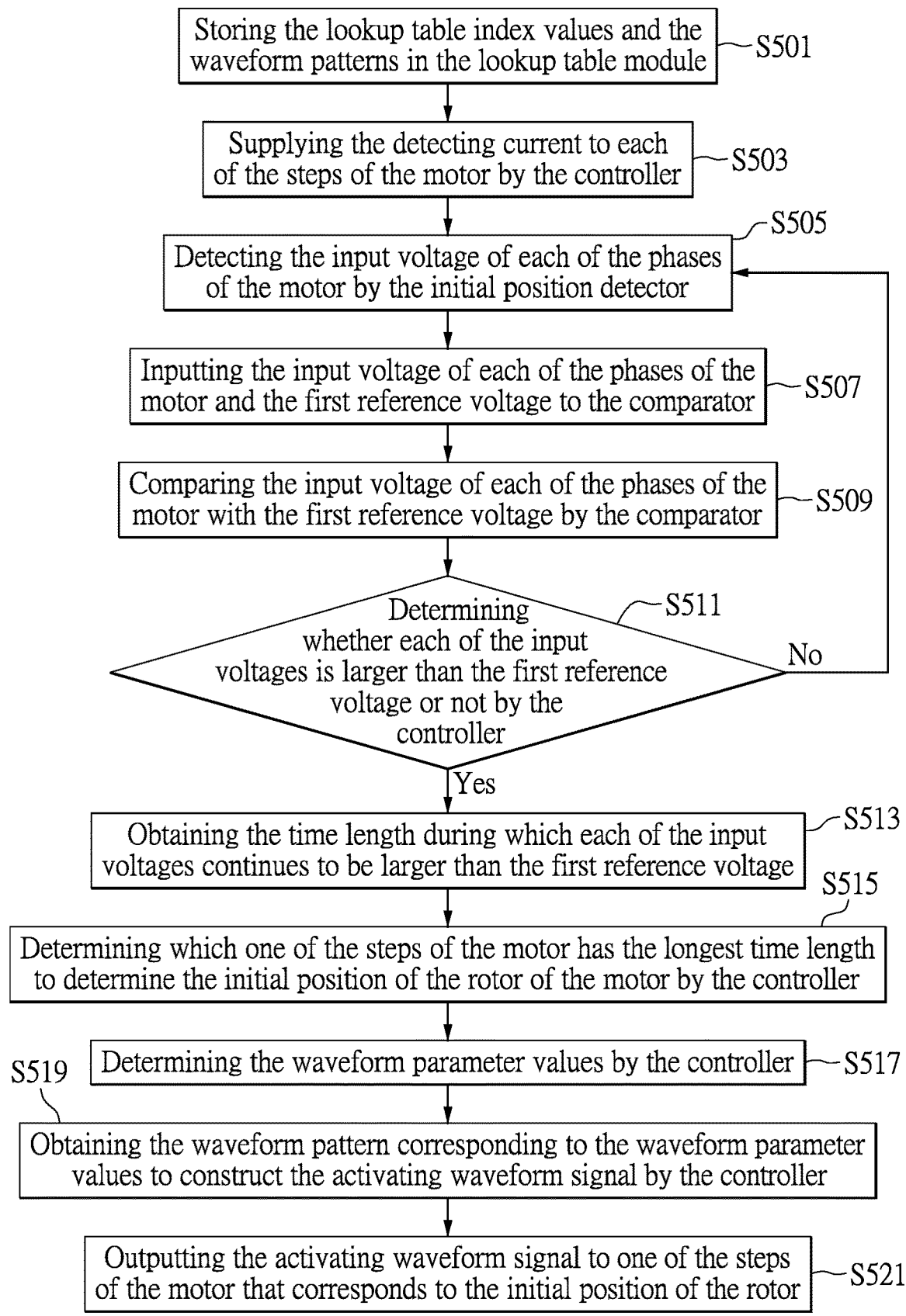
FIG. 5 is a flowchart of a method for automatically detecting the initial position of the rotor of the motor according to the first embodiment of the present disclosure.

Reference is made to FIG. 5, which is a flowchart of a method for automatically detecting the initial position of the rotor of the motor according to the first embodiment of the present disclosure. As shown in FIG. 5, in the embodiment, the method for automatically detecting the initial position of the rotor of the motor includes the following steps S501 to S521 for the above device 1.

In step S501, the lookup table module stores the lookup table index values and the waveform patterns.

In step S503, the controller controls the switch module to supply the detecting current to each of the steps of the motor through the coil windings.

In step S505, the initial position detector detects the input voltage at the voltage input terminal of each of the phases of the motor.

In step S507, the input voltage at the voltage input terminal of each of the phases of the motor and the first reference voltage are inputted to the comparator of the initial position detector.

In step S509, the comparator of the initial position detector compares the input voltage at the voltage input terminal of each of the phases of the motor with the first reference voltage.

In step S511, the controller determines whether each of the input voltages is larger than the first reference voltage. If the input voltage is not larger than the first reference voltage, step S505 is performed again. If the input voltage is larger than the first reference voltage, the controller starts timing and records the time length during which the input voltage continues to be larger than the first reference voltage in step S513. It should be understood that, when the switch module supplies the detecting current and the input voltage of each of the phases of the motor (namely, the output voltage of the switch module) is larger than the first reference voltage, the timer disposed additionally or inside the controller starts timing, and when a time of a cycle of a waveform of the detecting control signal OTPS ends, the timer stops timing. The controller records the time length during which the input voltage of each of the phases of the motor is larger than the first reference voltage while the comparison result Cout is at a high level as shown in FIG. 3. Then, step S515 is performed.

In step S515, the controller compares the time lengths with each other to determine which one of the time lengths is the longest to check the initial position of the rotor of the motor.

In step S517, the controller determines the waveform parameter values.

In step S519, the controller compares the waveform parameter values with the lookup table index values to obtain the corresponding waveform pattern to construct the activating waveform signal.

In step S521, the controller outputs the activating waveform signal to one of the steps of the motor that corresponds to the initial position of the rotor to control the motor to run.

Figure 6:
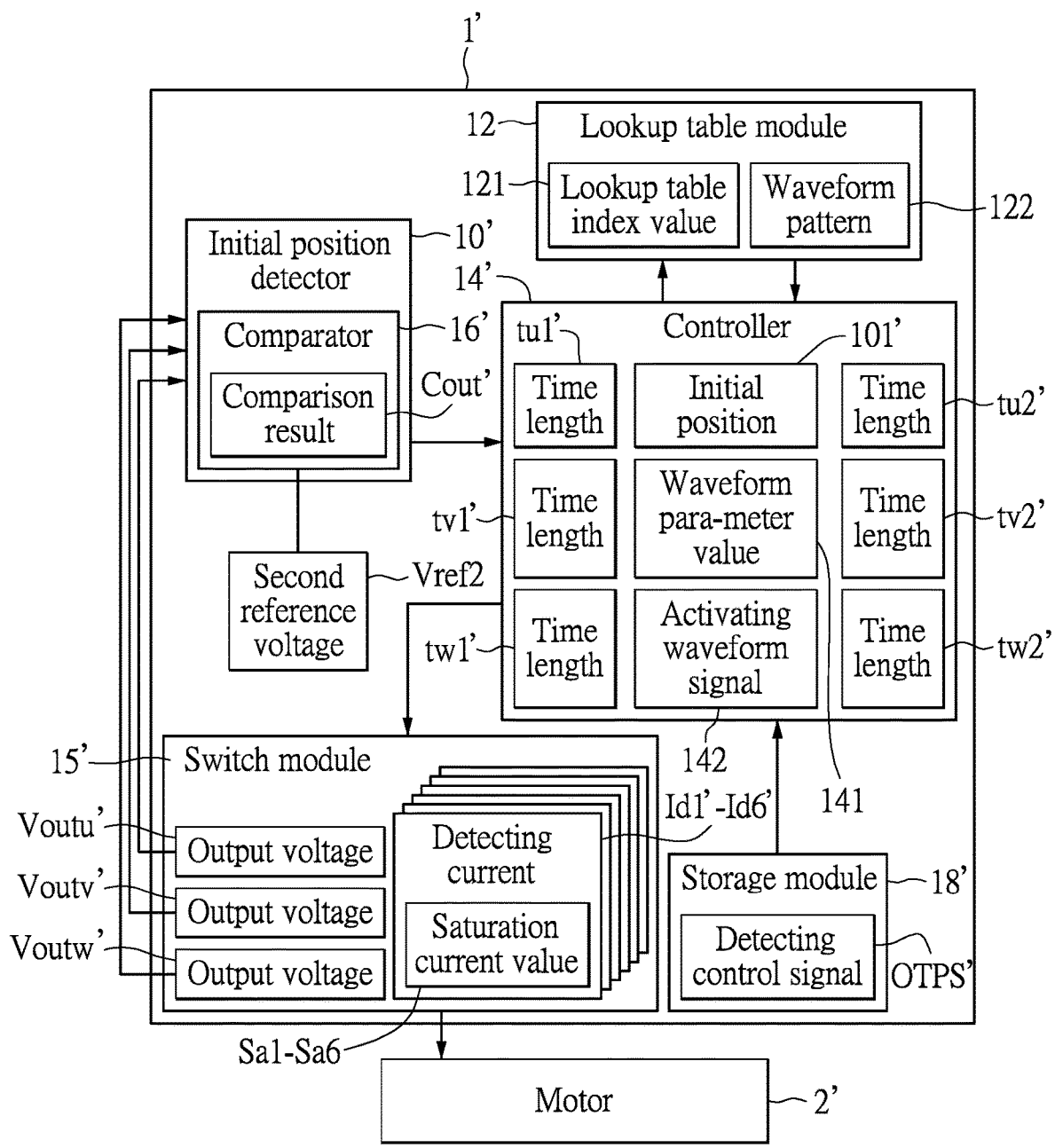
FIG. 6 is a block diagram of a device for automatically detecting an initial position of a rotor of a motor according to a second embodiment of the present disclosure.
Figure 7A:
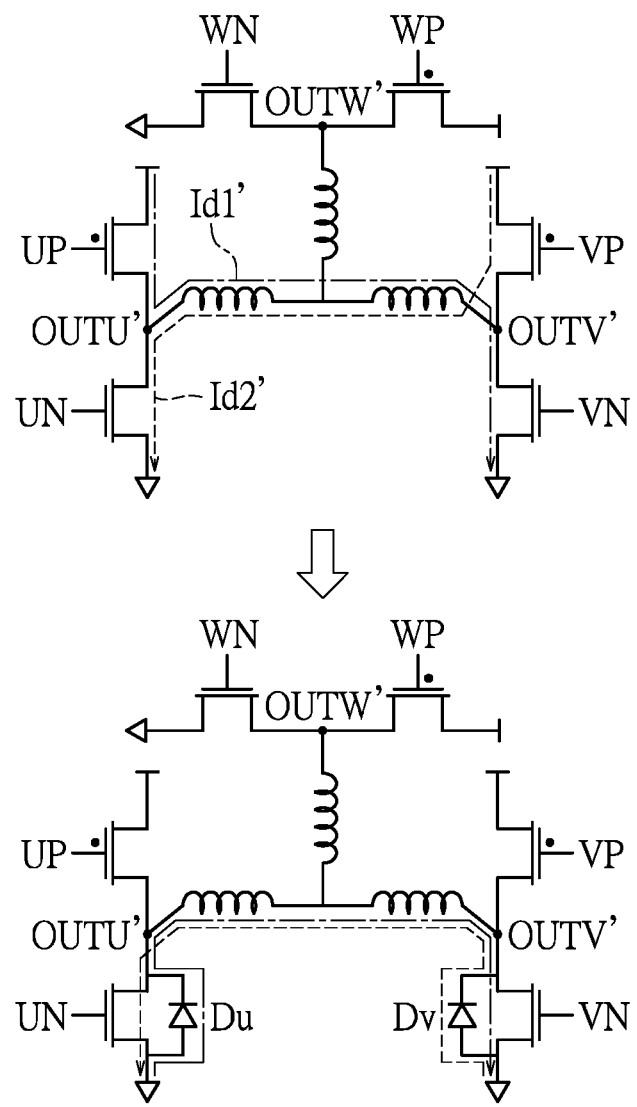
FIGS. 7a to 7c are schematic diagrams of the device for automatically detecting the initial position of the rotor of the motor applied in a three-phase motor having U, V and W phases supplied with detecting currents according to the second embodiment of the present disclosure.
Figure 7B:
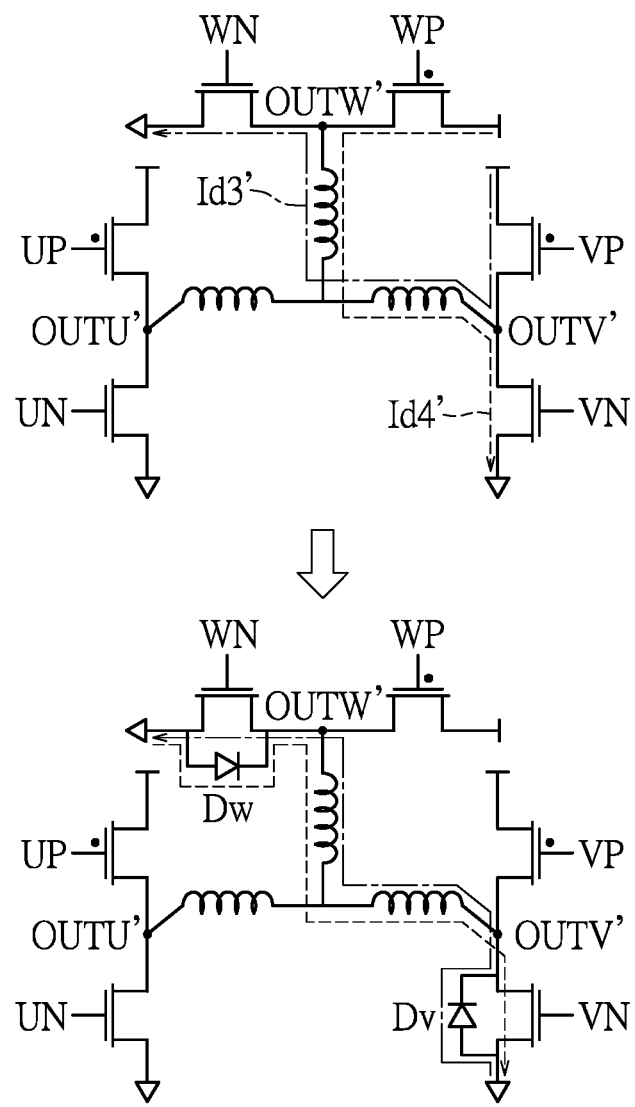
Figure 7C:
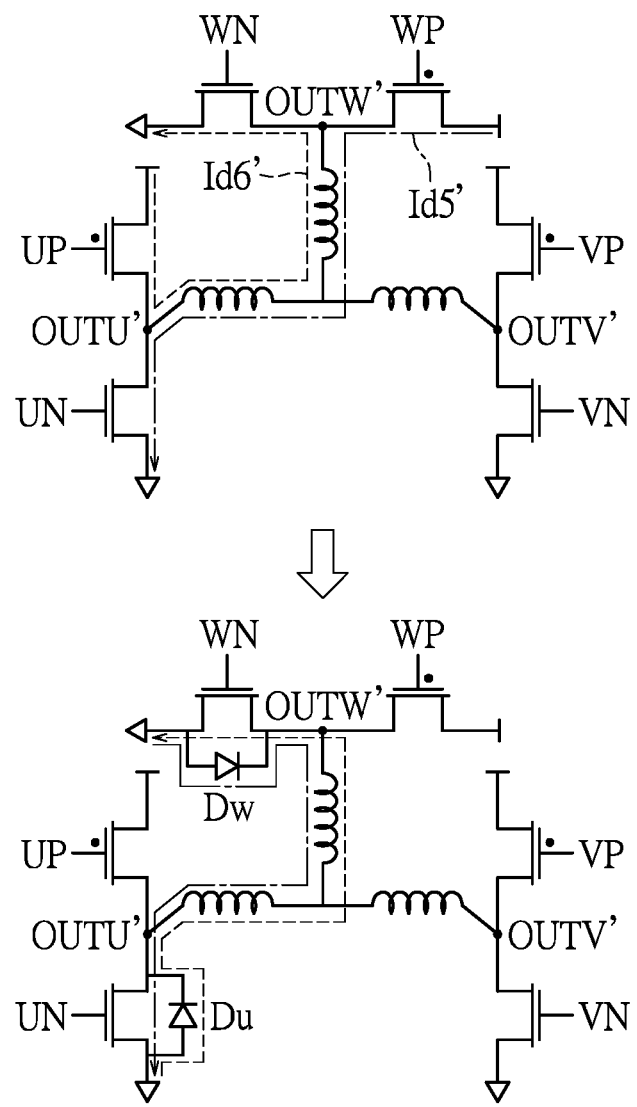
Figure 8:
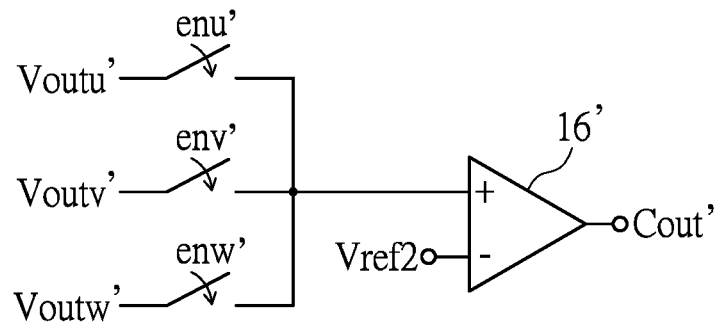
FIG. 8 is a circuit layout of a comparator of the device for automatically detecting the initial position of the rotor of the motor according to the second embodiment of the present disclosure.
Figure 9:
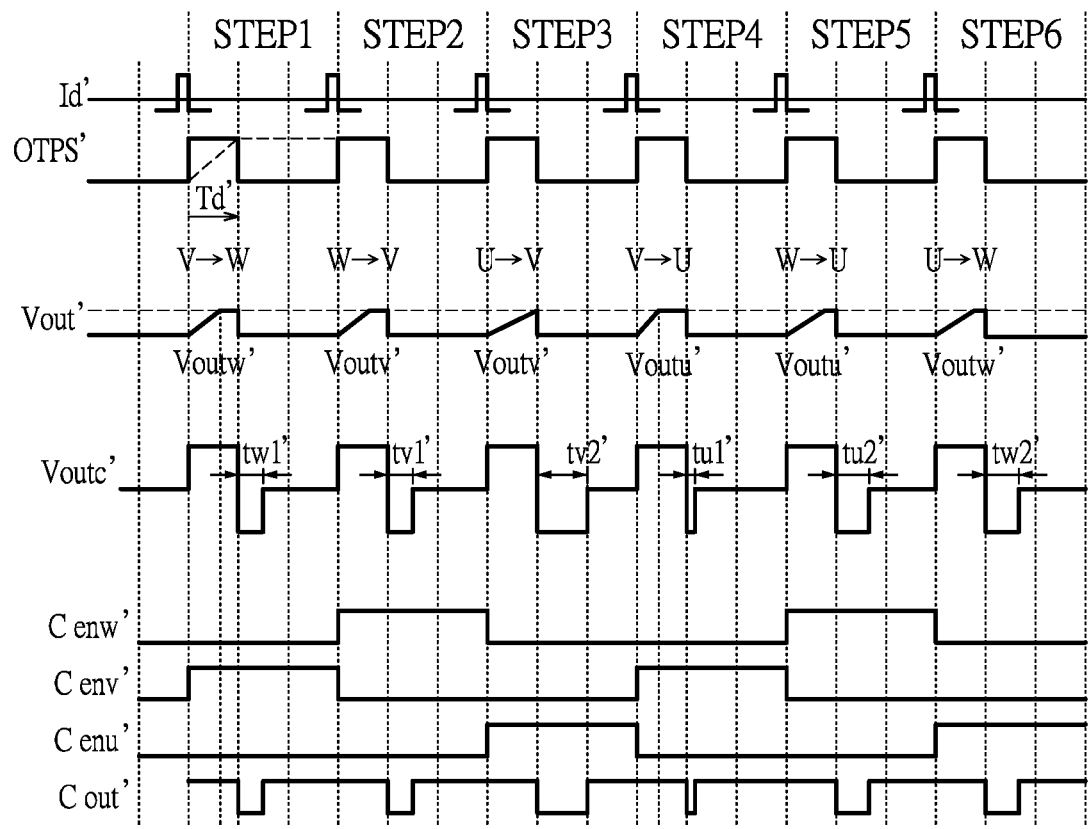
FIG. 9 is a waveform diagram of signals of a controller, the comparator and the applied motor of the device for automatically detecting the initial position of the rotor of the motor according to the second embodiment of the present disclosure.

Reference is made to FIGS. 6 to 9. FIG. 6 is a block diagram of a device for automatically detecting an initial position of a rotor of a motor according to a second embodiment of the present disclosure; FIGS. 7a to 7c are schematic diagrams of the device for automatically detecting the initial position of the rotor of the motor applied in a three-phase motor having U, V and W phases supplied with detecting currents according to the second embodiment of the present disclosure; FIG. 8 is a circuit layout of a comparator of the device for automatically detecting the initial position of the rotor of the motor according to the second embodiment of the present disclosure; FIG. 9 is a waveform diagram of signals of a controller, the comparator and the applied motor of the device for automatically detecting the initial position of the rotor of the motor according to the second embodiment of the present disclosure.

As shown in FIG. 6, in the embodiment, a device 1' for automatically detecting the initial position of the rotor of the motor includes an initial position detector 10', the lookup table module 12, a controller 14', a switch module 15' and a storage module 18'. The switch module 15' is connected to the initial position detector 10', the controller 14' and a motor 2'. The controller 14' is connected to the initial position detector 10', the lookup table module 12 and the storage module 18'. The initial position detector 10 includes a comparator 16'.

The controller 14' may control the switch module 15' to supply detecting currents to the motor 2'. In an upper circuit shown of FIG. 7a, a detecting current Id1' flows to the lower bridge VN of the V phase sequentially through two coil windings between a voltage output terminal OUTU' and a voltage output terminal OUTV' from the upper bridge UP of the switch module 15' connected to the U phase of the three-phase motor 2'

In the first embodiment, as shown in FIG. 4, the shortest constant conduction time Td is set. In contrast, in the second embodiment, as shown in FIG. 9, a detecting control signal OTPS' has a plurality of waveforms each having a shortest constant conduction time Td'. The waveforms of the detecting control signal OTPS' correspond to six waveforms of a voltage waveform signal Vout' respectively. The storage module 18' as shown in FIG. 1 stores the detecting control signal OTPS' and outputs it to the controller 14'. It is worth noting that the shortest constant conduction time Td' is a shortest time during which each of the detecting currents supplied to the motor 2' reaches saturation and has the same saturation current value.

The detecting current Id1' in FIG. 7a reaches saturation and has a saturation current value Sa1 in FIG. 6 during the shortest constant conduction time Td' in FIG. 9. After the shortest constant conduction time Td' ends, the upper bridge UP and the lower bridge UN of the U phase are turned off such that the detecting current Id1' flows through an internal diode Du, as shown in a lower circuit shown of FIG. 7a. At this time, the output voltage Voutu' at the voltage output terminal OUTU' connected to a node between the upper bridge UP and the lower bridge UN of the U phase has a voltage value that is equal to a conduction voltage of the internal diode Du.

Then, in the upper circuit shown in FIG. 7a, a detecting current Id2' is supplied to the lower bridge UN of the switch module 15' from the upper bridge VP of the switch module 15'. Similarly, the detecting current Id2' reaches saturation and has a saturation current value Sa2 shown in FIG. 6 during the shortest constant conduction time Td' as shown in FIG. 9. After the shortest constant conduction time Td' ends, the upper bridge VP and the lower bridge VN of the switch module 15' are turned off such that the detecting current Id2' flows to an internal diode Dv, as the lower circuit shown in FIG. 7a. At this time, the output voltage Voutv' at the voltage output terminal OUTV' has a voltage value that is equal to a conduction voltage of the internal diode Dv.

Then, in an upper circuit shown in FIG. 7b, a detecting current Id3' flows to the lower bridge WN of the phase W sequentially through two coil windings between the voltage output terminal OUTV' and a voltage output terminal OUTW' from the upper bridge VP of the phase V of the three-phase motor 2'. After the shortest constant conduction time Td' during which the detecting current Id3' reaches saturation and has a saturation current value Sa3 ends, the upper bridge VP and the lower bridge VN of the V phase are turned off such that the detecting current Id3' flows to an internal diode Dv of the lower bridge VN as shown in a lower circuit of FIG. 7b. At this time, the output voltage Voutv' at the voltage output terminal OUTV' of the switch module 15' that is connected to a node between the upper bridge VP and the lower bridge VN of the V phase has a voltage value equal to a conduction voltage of the internal diode Dv.

Then, in the upper circuit shown in FIG. 7b, a detecting current Id4' is supplied to the lower bridge VN of the switch module 15' from the upper bridge WP of the switch module 15'. The detecting current Id4' reaches saturation and has a saturation current value Sa4 shown in FIG. 6 during the shortest constant conduction time Td'. After the shortest constant conduction time Td' ends, the upper bridge WP and the lower bridge WN of the W phase are turned off such that the detecting current Id4' flows to an internal diode Dw of the lower bridge WN, as shown in the lower circuit of FIG. 7b. At this time, the output voltage Voutw' at the voltage output terminal OUTW' has a voltage value that is equal to a conduction voltage of the internal diode Dw.

Then, in an upper circuit of FIG. 7c, a detecting current Id5' is supplied to the lower bridge UN of the phase U sequentially through the two coil windings between the voltage output terminal OUTW' and the voltage output terminal OUTU' from the upper bridge WP of the phase W of the three-phase motor 2'. After the shortest constant conduction time Td' during which the detecting current Id5' reaches saturation and has a saturation current value Sa5 ends, the upper bridge WP and the lower bridge WN of the W phase are turned off such that the detecting current Id5' flows to an internal diode Dw of the lower bridge WN as shown in a lower circuit of FIG. 7c. At this time, the output voltage Voutw' at the voltage output terminal OUTW' of the switch module 15' that is connected to a node between the upper bridge WP and the lower bridge WN of the W phase has a voltage value equal to a conduction voltage of the internal diode Dw.

Then, in the upper circuit shown of FIG. 7b, a detecting current Id6' is supplied to the lower bridge WN of the switch module 15' of the W phase of the motor 2' from the upper bridge UP of the switch module 15' of the U phase of the motor 2'. The detecting current Id6' reaches saturation and has a saturation current value Sa6 shown in FIG. 6 during the shortest constant conduction time Td'. After the shortest constant conduction time Td' ends, the upper bridge UP and the lower bridge UN of the U phase are turned off such that the detecting current Id6' flows to an internal diode Du of the lower bridge UN, as shown in the lower circuit of FIG. 7c. At this time, the output voltage Voutu' at the voltage output terminal OUTU' has a voltage value that is equal to a conduction voltage of the internal diode Du.

As shown in FIG. 8, the output voltages Voutu', Voutv' and Voutw' at the voltage output terminals OUTU', OUTV' and OUTW' of the switch module 15' are inputted to the first input terminal of the comparator 16'. When the internal diodes Du, Dv and Dw are turned on, each of the output voltages Voutu', Voutv' and Voutw' is −0.7 volt. A second reference voltage Vref2 is inputted to the second input terminal of the comparator 16'. The second reference voltage Vref2 may be half of a negative conduction voltage of the diode Du, which is an internal diode or a parasitic diode of the switch component. For example, if the internal diodes Du, Dv and Dw are made of silicon (Si) materials, the conduction voltage of each of the internal diodes Du, Dv and Dw is about 0.6 volt to 0.7 volt, the output voltage Voutu' of the switch module 15' is about −0.6 volt to −0.7 volt, and the second reference voltage Vref2 may be −0.35 volt. Alternatively, if the internal diodes Du, Dv and Dw are made of germanium (Ge) materials, the conduction voltage of each of the internal diodes Du, Dv and Dw is about 0.2 volt to 0.3 volt, the output voltage Voutu' of the switch module 15' is about −0.2 volt to −0.3 volt.

The controller 14' supplies the stored detecting currents Id1' to Id6' respectively. The controller 14' turns off the upper bridge and lower bridge of the switch module 15', such that the output voltage Voutc' at each of the voltage output terminals OUTU', OUTV' and OUTW' is reduced to the negative conduction voltage value such as −0.7 volt of each of the internal diodes Du, Dv and Dw, from a saturation voltage value while the comparison result Cout' representing a high level as shown in FIG. 9. The controller 14' starts timing to obtain the time lengths tu2', tu1', tw1', tv1', tu2', tw2' during which the output voltage Voutc' at the voltage output terminals OUTU', OUTV' and OUTW' is increased to 0 volt from the negative conduction voltage value of each of the internal diodes Du, Dv and Dw such as −0.7 volt.

For example, the first input terminal of the comparator 16' is an inverting input terminal, and the second input terminal of the comparator 16' is a non-inverting input terminal, which are used for the detection of the initial position 101' of the rotor of the motor 2', or vice versa, but the comparison result Cout' is an inverse logic value.

In the embodiment, when the output voltage Voutu' at the voltage output terminal OUTU' of the switch module 15' as shown in FIG. 7a is smaller than the second reference voltage Vref2, the comparator 16' outputs the comparison result Cout' representing logic "0", i.e. a low level. This operation may be applied for other output voltages Voutw' and Voutv'.

An output terminal of the comparator 16' is connected to the controller 14'. The controller 14' records the comparison result Cout' of the comparator 16'. The controller 14' may check the time lengths tu1', tu2', tv1', tv2', tw1' and tw2' according to the comparison result Cout'. The controller 14' may then compare the time lengths tu1', tu2', tv1 tv2', tw1' and tw2' with each other to determine which one of the time lengths tu1', tu2', tv1', tv2', tw1' and tw2' is the shortest, and accordingly determine the initial position 101' of the rotor of the motor 2'. For example, if the time length tu1' is smaller than other time lengths tu2', tv2', tw1' and tw2', it is determined that a sum inductance value of the two coil windings through which the detecting current Id2' flows as shown in FIG. 7c is the smallest, and thus the initial position 101' of the rotor of the motor 2' is at the step corresponding to the upper bridge UP of the U phase.

It is worth noting that each of the output voltages Voutu', Voutw' and Voutv' and the second reference voltage Vref2 has a very small voltage value, such as a voltage value within a range of −0.7V to 0V. If the second reference voltage Vref2 is set as −0.35V, an error voltage such as 0.34V cannot cause an error result. Therefore, the output voltages Voutu', Voutw' and Voutv' of the switch module 15' does not need to be converted by the analog-to-digital converter (ADC) and can be converted by the common comparator for converting data having 10 bits merely, to realize the detection of the initial position 101' of the motor 2'.

Figures 10, 10A:
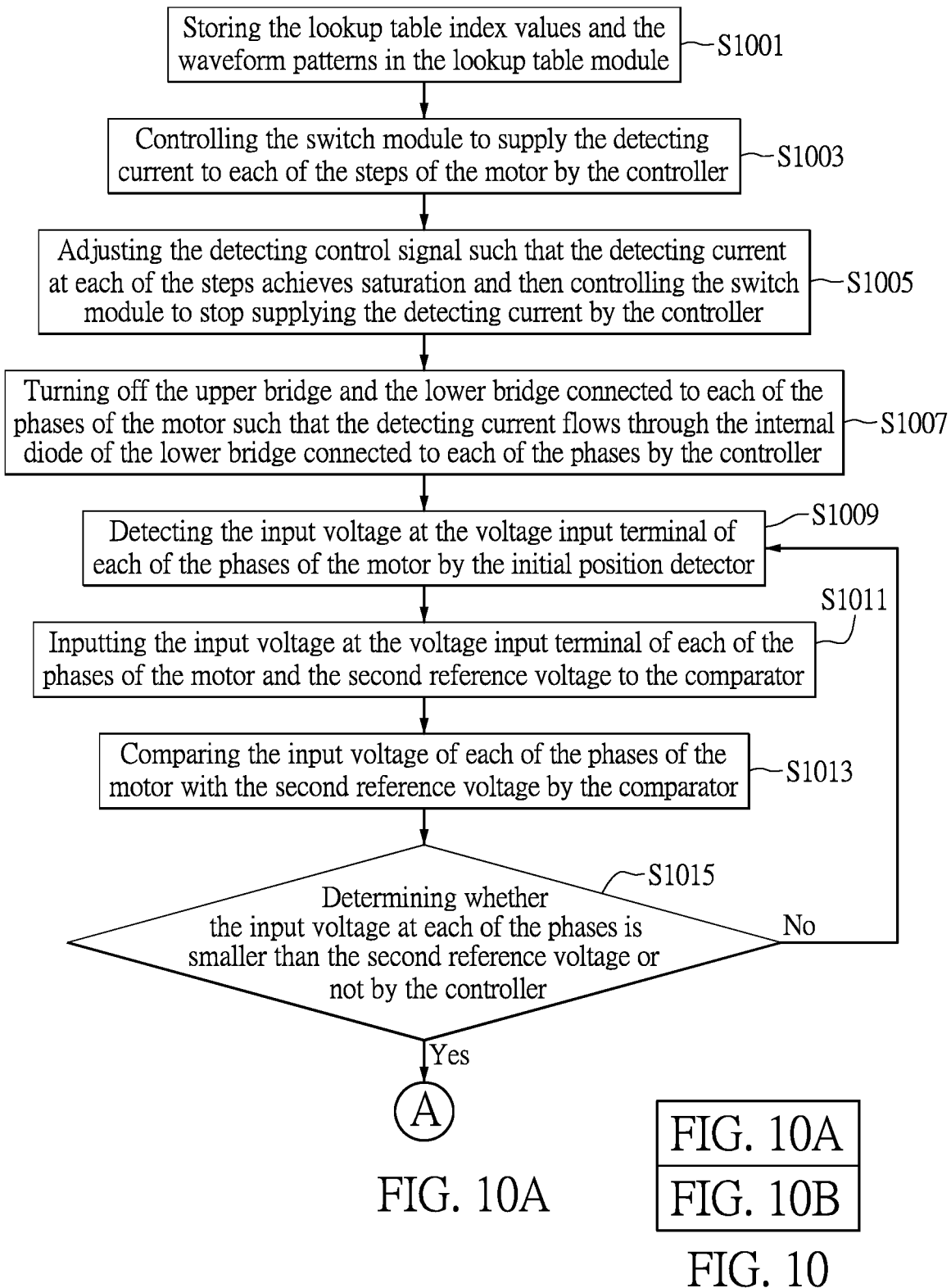
FIGS. 10A and 10B are flowcharts of a method for automatically detecting the initial position of the rotor of the motor according to the second embodiment of the present disclosure.
Figure 10B:
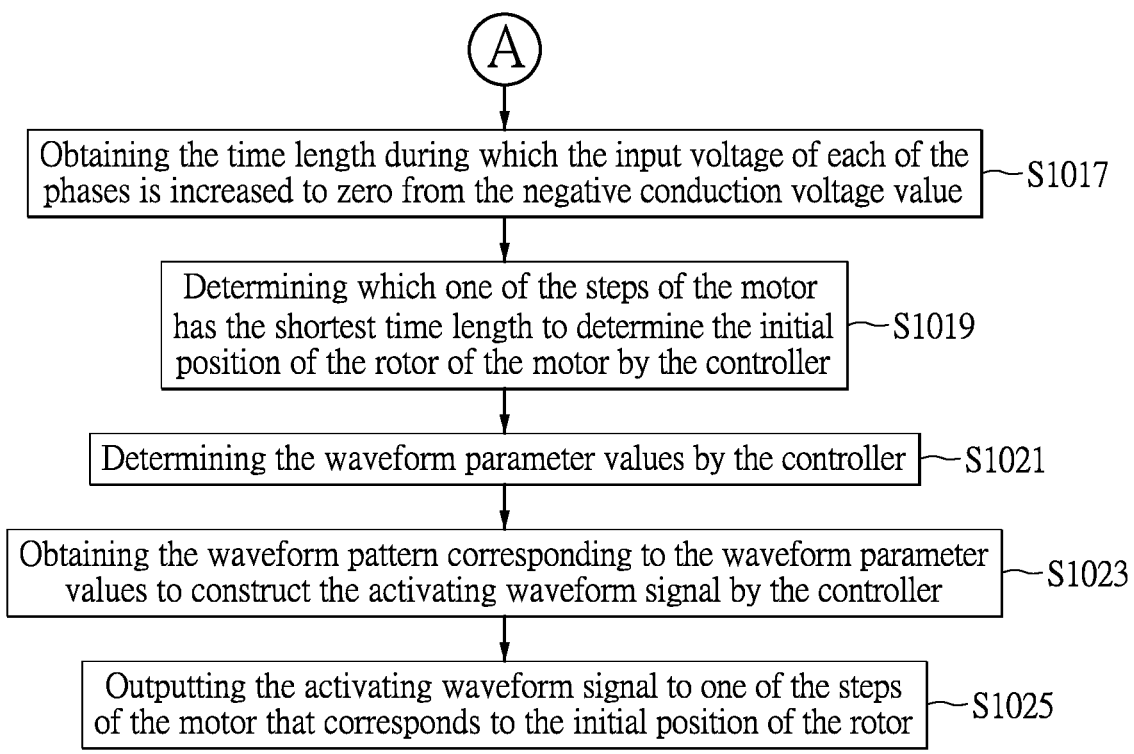

Reference is made to FIGS. 10A and 10B, which are flowcharts of a method for automatically detecting the initial position of the rotor of the motor according to the second embodiment of the present disclosure. As shown in FIGS. 10A and 10B, in the embodiment, the method for automatically detecting the initial position of the rotor of the motor includes the following steps S1001 to S1025 for the above device 1'.

In step S1001, the lookup table module stores the lookup table index values and the waveform patterns.

In step S1003, the switch module supplies the detecting current to each of the steps of the motor through the coil windings.

In step S1005, when the detecting current at each of the steps reaches saturation and has the saturation current value, the controller controls the switch module to stop supplying the detecting current.

In step S1007, the controller turns off the upper bridge and the lower bridge connected to each of the phases of the motor such that the detecting current flows to the internal diode of the lower bridge of each of the phases. At this time, the output voltage of the switch module is reduced to the negative conduction voltage value such as −0.7 volt of the diode from the saturation voltage value.

In step S1009, the initial position detector detects the input voltage at the voltage input terminal of each of the phases of the motor.

In step S1011, the input voltage of each of the phases of the motor and the second reference voltage are inputted to the comparator of the initial position detector.

In step S1013, the comparator compares the input voltage of each of the phases of the motor with the second reference voltage.

In step S1015, the controller determines whether the input voltage of each of the phases is smaller than the second reference voltage. If the input voltage is not smaller than the second reference voltage, step S1009 is performed again. If the input voltage is smaller than the second reference voltage, the controller obtains the time length, during which the output voltage of the switch module is increased to 0 volt from a value equal to the negative conduction voltage such as −0.7 volt of the internal diode, according to the comparison result of the comparator in step S1017. Then, step S1019 is performed.

In step S1019, the controller determines which one of the steps of the motor has the shortest time length to determine the initial position of the rotor of the motor.

In step S1021, the controller determines the waveform parameter values.

In step S1023, the controller compares the waveform parameter values with the lookup table index values to obtain the corresponding waveform pattern used for constructing the activating waveform signal.

In step S1025, the controller supplies the activating waveform signal to one of the steps of the motor that corresponds to the initial position of the rotor to control the motor to run.

Figure 11:
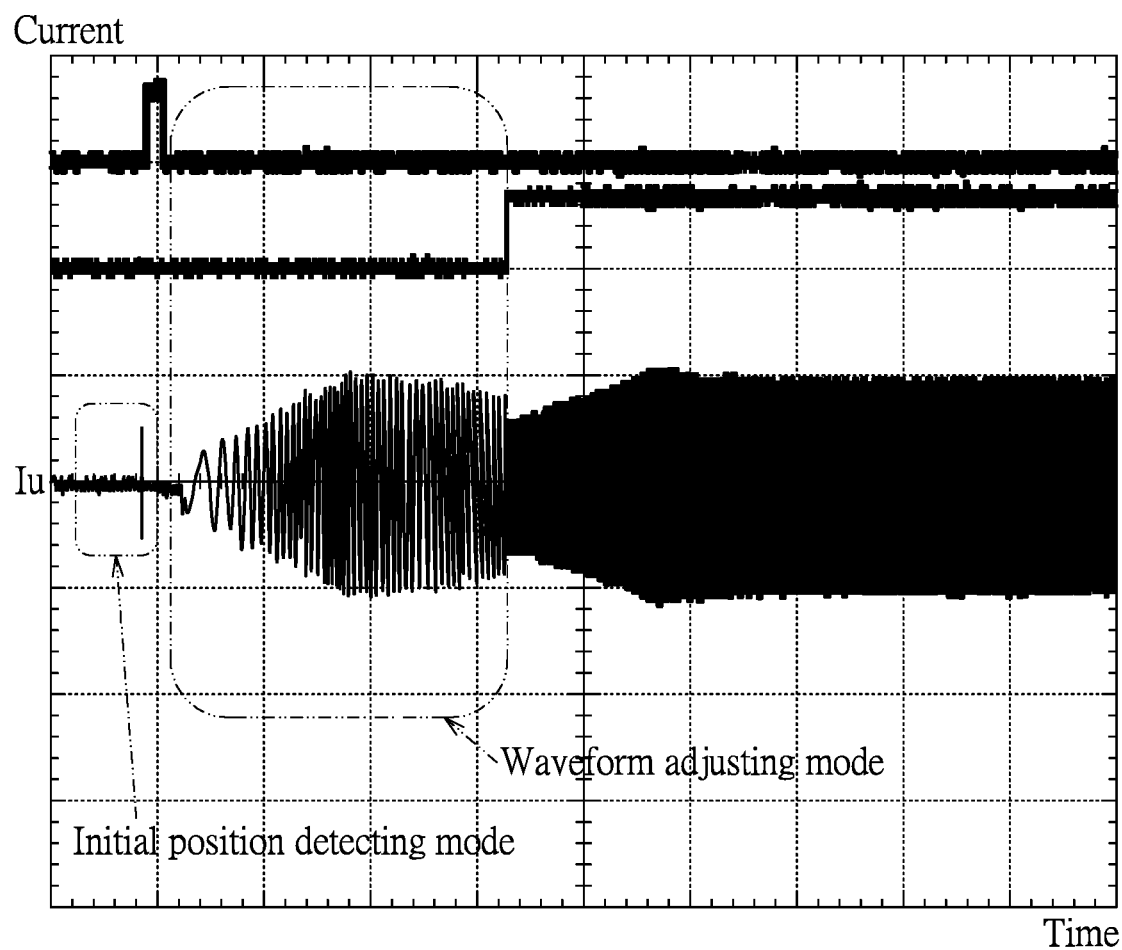
FIG. 11 is a graph of a phase current versus time for the motor applied by the device for automatically detecting the initial position of the rotor of the motor according to the present disclosure.

Reference is made to FIG. 11, which is a graph of a phase current versus time for the motor applied by the device for automatically detecting the initial position of the rotor of the motor according to the present disclosure.

Figure 12:
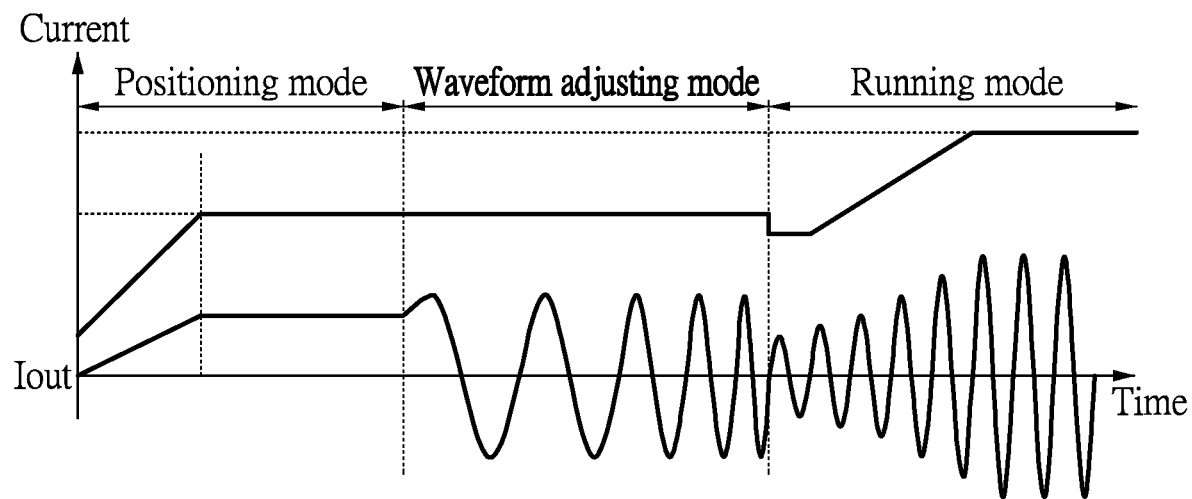
FIG. 12 is a graph of a phase current versus time for a motor applied by a conventional motor driving device.

As shown in FIG. 12, the conventional motor driving device takes a longtime for preparing for positioning an initial position of the motor in a positioning mode before driving a motor to run. In contrast, in the embodiment, as shown in FIG. 11, in an initial position detecting mode, the detecting current included in a current Iu of the U phase has a transitory conduction time such as the above longest conduction time Td or the shortest conduction time Td'. The time length of supplying the detecting current is short and the amplitude of the detecting current is small. Therefore, the initial position of the rotor of the motor can be detected in a short time without driving the rotor of the motor to run and causing the motor to vibrate and generating noise. Further, as shown in FIG. 11, the device of the present disclosure can quickly enter a waveform adjusting mode, and then drive the motor to stably run. In the embodiment, the current Iu of the U phase is taken as an example. It should be understood that the currents of the V phase and the W phase have the same detecting time as that of the current Iu of the U phase, so that the abovementioned effect of the U phase can also be achieved by the V phase and W phase.

The present disclosure provides the device and the method for automatically detecting the initial position of the rotor of the motor, which have the following beneficial advantageous effects. The device of the present disclosure supplies the different detecting currents to the motor. After supplying the detecting current, the device of the present disclosure detects the change in the input voltage of each of the phases of the motor, and calculates the time length during which each of the input voltage changes. The device of the present disclosure compares all of the time lengths during which the input voltages change with each other to determine the longest time length as described in the first embodiment or the shortest time length as described in the second embodiment. The device of the present disclosure determines which one of the steps to which the detecting current is supplied through the coil windings of the motor has the smallest inductance values to determine the initial position of the rotor of the motor. Therefore, the present disclosure can accurately detect the initial position of the motor in a short time and thus can quickly drive the motor to run, without causing the motor to vibrate and generating noise.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A device for automatically detecting an initial position of a rotor of a motor having N phases and M steps, M being equal to twice N, the device comprising:
    an initial position detector connected to a voltage input terminal of each of the phases of the motor and configured to detect an input voltage at the voltage input terminal before the motor runs;
    a lookup table module configured to store a plurality of lookup table index values and a plurality of waveform patterns that correspond to the lookup table index values respectively; and
    a controller connected to the initial position detector, the lookup table module and the motor, configured to compare the input voltages with each other from the initial position detector to determine the initial position of the rotor of the motor and a plurality of waveform parameter values, and configured to compare the waveform parameter values with the lookup table index values to obtain one of the waveform patterns that corresponds to the waveform parameter values to construct an activating waveform signal to be outputted to the step of the motor that corresponds to the initial position of the rotor to control the motor to run.

2. The device of claim 1, wherein the waveform patterns includes a plurality of sine waveform patterns, and the waveform parameter values include a duty cycle, a frequency, an amplitude and a sustained acceleration time of each of the sine waveform patterns.

3. The device of claim 1, further comprising: a switch module connected to the motor and controlled to supply a detecting current to each of the steps of the motor through coil windings of the motor by the controller, wherein when the input voltage at the voltage input terminal of each of the phases of the motor is larger than a first reference voltage, the controller starts timing, and when the input voltage is reduced to be smaller than the first reference voltage, the controller stops timing, to obtain a time length during which the input voltage continues to be larger than the first reference voltage, wherein the controller determines which one of the steps of the motor has a longest time length to determine the initial position of the rotor of the motor.

4. The device of claim 3, wherein the initial position detector includes a comparator, which has a first input terminal connected to the voltage input terminal of each of the phases of the motor, a second input terminal connected to a first reference voltage, and an output terminal connected to the controller, wherein the comparator is configured to compare the input voltage of each of the phases of the motor with the first reference voltage to generate a comparison result to be outputted to the controller through the output terminal of the comparator, and the controller determines whether the input voltage is larger than the first reference voltage according to the comparison result.

5. The device of claim 1, further comprising: a storage module connected to the controller and configured to store a detecting control signal to be outputted to the controller, wherein the controller controls operations of the switch module and the motor according to the detecting control signal, the detecting control signal has a plurality of waveforms, a period of each of the waveforms has a shortest constant conduction time that is a shortest time during which the input voltage at the voltage input terminal of each of the phases of the motor is larger than the first reference voltage.

6. The device of claim 1, further comprising: a switch module connected to the controller and the motor and controlled to supply a detecting current to each of the steps of the motor through coil windings of the motor by the controller, wherein when the detecting current of each of the step reaches saturation and has a saturation current value, the controller controls the switch module to stop supplying the detecting current and then turns off an upper bridge and a lower bridge of the switch module connected to each of the phases of the motor, such that the detecting current flows through an internal diode of the lower bridge of the switch module connected to each of the phases of the motor, and the input voltage of each of the phases of the motor is equal to a negative conduction voltage of the internal diode, the controller starts timing to obtain a time length during which the input voltage of each of the phases of the motor is increased to zero from a voltage value equal to the negative conduction voltage and determines which one of the steps of the motor has a shortest time length to determine the initial position of the rotor of the motor.

7. The device of claim 6, wherein the input voltage of each of the phases of the motor has a voltage value equal to that of a conduction voltage of the internal diode, the voltage value of the conduction voltage is not larger than 0.7 volt.

8. The device of claim 6, further comprising: a storage module connected to the controller and configured to store a detecting control signal to be outputted to the controller, wherein the controller controls operations of the switch module and the motor according to the detecting control signal, the detecting control signal has a plurality of waveforms, a period of each of the waveforms has a shortest constant conduction time that is a shortest time during which each of the M detecting currents supplied to the motor reaches saturation and has the same saturation current value.

9. The device of claim 6, wherein the initial position detector includes a comparator, which has a first input terminal connected to the voltage input terminal of each of the phases of the motor, a second input terminal connected to a second reference voltage, and an output terminal connected to the controller, wherein the comparator is configured to compare the input voltage of each of the phases of the motor with the second reference voltage to generate a comparison result to be outputted to the controller through the output terminal of the comparator, and the controller determines whether the input voltage is equal to the conduction voltage according to the comparison result.

10. A method for automatically detecting an initial position of a rotor of a motor having N phases and M steps, M being equal to twice N, the method comprising:
storing a plurality of lookup table index values and a plurality of waveform patterns that respectively correspond to the lookup table index values in a lookup table module;
detecting an input voltage at a voltage input terminal of each of the phases of the motor by an initial position detector before the motor runs;
comparing the voltage input voltages with each other to determine the initial position of the rotor of the motor and a plurality of waveform parameter values by a controller;
comparing the waveform parameter values with the lookup table index values to obtain one of the waveform patterns that corresponds to the waveform parameter values to construct an activating waveform signal by the controller; and
supplying the activating waveform signal to the step of the motor that corresponds to the initial position of the rotor from the controller.

11. The method of claim 10, wherein the waveform patterns includes a plurality of sine waveform patterns, and the waveform parameter values includes a duty cycle, a frequency, an amplitude and a sustained acceleration time of each of the sine waveform patterns.

12. The method of claim 10, further comprising steps of:
supplying a detecting current to each of the steps of the motor through coil windings of the motor from a switch module until the input voltage at the voltage input terminal of each of the phases of the motor is increased to be larger than a first reference voltage;
timing to obtain a time length during which the input voltage continues to be larger than the first reference voltage by the controller; and
determining which one of the steps of the motor has a longest time length to check the initial position of the rotor of the motor by the controller.

13. The method of claim 12, further comprising steps of:
inputting the input voltage of each of the phases of the motor to a first input terminal of a comparator;
inputting the first reference voltage to a second input terminal of the comparator;
comparing the input voltage of each of the phases of the motor with the first reference voltage to generate a comparison result to be outputted to the controller through an output terminal of the comparator by the comparator; and
determining whether the input voltage is larger than the first reference voltage by the controller according to the comparison result, in response to the input voltage being larger than the first reference voltage, recording the time length during which the input voltage continues to be larger than the first reference voltage, in response to the input voltage not being larger than the first reference voltage, continuously timing.

14. The method of claim 12, further comprising steps of:
storing a detecting control signal in a storage module and outputting the detecting control signal to the controller; and
controlling operations of the switch module and the motor according to the detecting control signal by the controller;
wherein the detecting control signal has a plurality of waveforms, a period of each of the waveforms has a shortest constant conduction time that is a shortest time during which the input voltage at the voltage input terminal of one of the phases of the motor is larger than the first reference voltage.

15. The method of claim 10, further comprising steps of:
controlling a switch module to supply a detecting current to each of the steps of the motor through coil windings of the motor by the controller;
when the detecting current of each of the step reaches saturation and has a saturation current value, turning off an upper bridge and a lower bridge of the switch module connected to each of the phases of the motor by the controller, such that the detecting current flows through an internal diode of the lower bridge of the switch module connected to each of the phases of the motor, wherein the input voltage of each of the phases of the motor is equal to a negative conduction voltage of the internal diode,
timing to obtain a time length during which the input voltage of each of the phases of the motor is increased to zero from a voltage value that is equal to the negative conduction voltage by the controller; and
determining which one of the steps of the motor has a shortest time length to determine the initial position of the rotor of the motor by the controller.

16. The method of claim 15, wherein the negative conduction voltage is −0.7 volt.

17. The method of claim 15, further comprising steps of:
inputting the input voltage of each of the phases of the motor to a first input terminal of a comparator;
inputting a second reference voltage to a second input terminal of the comparator;

comparing the input voltage of each of the phases of the motor with the second reference voltage to generate a comparison result to be outputted to the controller through an output terminal of the comparator by the comparator; and recording the time length during which the input voltage is increased to zero from a voltage value that is equal to the negative conduction voltage by the controller.

18. The method of claim 15, further comprising steps of:

storing a detecting control signal in a storage module and outputting the detecting control signal to the controller; and controlling operations of the switch module and the motor according to the detecting control signal by the controller;

wherein the detecting control signal has a plurality of waveforms, a period of each of the waveforms has a shortest constant conduction time that is a shortest time during which each of the M detecting currents supplied to the motor reaches saturation and has the same saturation current value.

* * * * *